(12) United States Patent
Andreaus et al.

(10) Patent No.: US 12,480,831 B2
(45) Date of Patent: Nov. 25, 2025

(54) METHOD FOR OPERATING A GROUP OF PRESSURE SENSORS

(71) Applicant: INFICON AG, Balzers (LI)

(72) Inventors: Bernhard Andreaus, Rapperswil (CH); Rolf Enderes, Malans (CH); Christian Berg, Stäfa (CH); Martin Wüest, Malans (CH)

(73) Assignee: INFICON AG, Balzers (LI)

( * ) Notice: Subject to any disclaimer, the term of this patent is extended or adjusted under 35 U.S.C. 154(b) by 346 days.

(21) Appl. No.: 18/030,430

(22) PCT Filed: Oct. 14, 2020

(86) PCT No.: PCT/EP2020/078937
§ 371 (c)(1),
(2) Date: Apr. 5, 2023

(87) PCT Pub. No.: WO2022/078594
PCT Pub. Date: Apr. 21, 2022

(65) Prior Publication Data
US 2023/0375428 A1 Nov. 23, 2023

(51) Int. Cl.
*G01L 27/00* (2006.01)
(52) U.S. Cl.
CPC ............................. *G01L 27/002* (2013.01)
(58) Field of Classification Search
CPC ....... G01L 27/002; G01L 15/00; G01L 21/30; G01L 27/02; G01L 21/12
See application file for complete search history.

(56) References Cited

U.S. PATENT DOCUMENTS

| 5,542,286 A | * | 8/1996 | Wang | G01N 30/32 73/23.24 |
| 10,663,337 B2 | * | 5/2020 | Penley | G01F 15/002 |

(Continued)

FOREIGN PATENT DOCUMENTS

| CN | 106645587 A | * | 5/2017 | ........... G01N 33/007 |
| DE | 19860500 A1 | | 7/2000 | |

(Continued)

OTHER PUBLICATIONS

International Search Report (with translation) and Written Opinion received in corresponding International Application No. PCT/EP2020/078937, dated Jun. 17, 2021, in 15 pages.

*Primary Examiner* — Tung S Lau
(74) *Attorney, Agent, or Firm* — Procopio, Cory, Hargreaves & Savitch, LLP

(57) ABSTRACT

Method for operating a group 1 of pressure sensors which are arranged in such a manner that they can measure the pressure in a common measurement volume 2, wherein the group of pressure sensors comprises at least a first pressure sensor 1' with a first pressure measurement range and a second pressure sensor 1" with a second pressure measurement range, wherein the first and second pressure measurement ranges overlap in an overlap pressure measurement range, wherein the first and second pressure sensors are each based on an indirect pressure measurement principle and are configured to output a measurement signal calibrated to a reference gas, and wherein the method comprises the steps of: a) providing calibration data specific to the type of gas for the first measurement signal and for the second measurement signal, which calibration data describe a dependence of the first and second measurement signals on the effective pressure and on a list of types of gas, respectively; b) recording a first and a second measured value of the first and second measurement signals, respectively; c) determin- (Continued)

Figure 4:
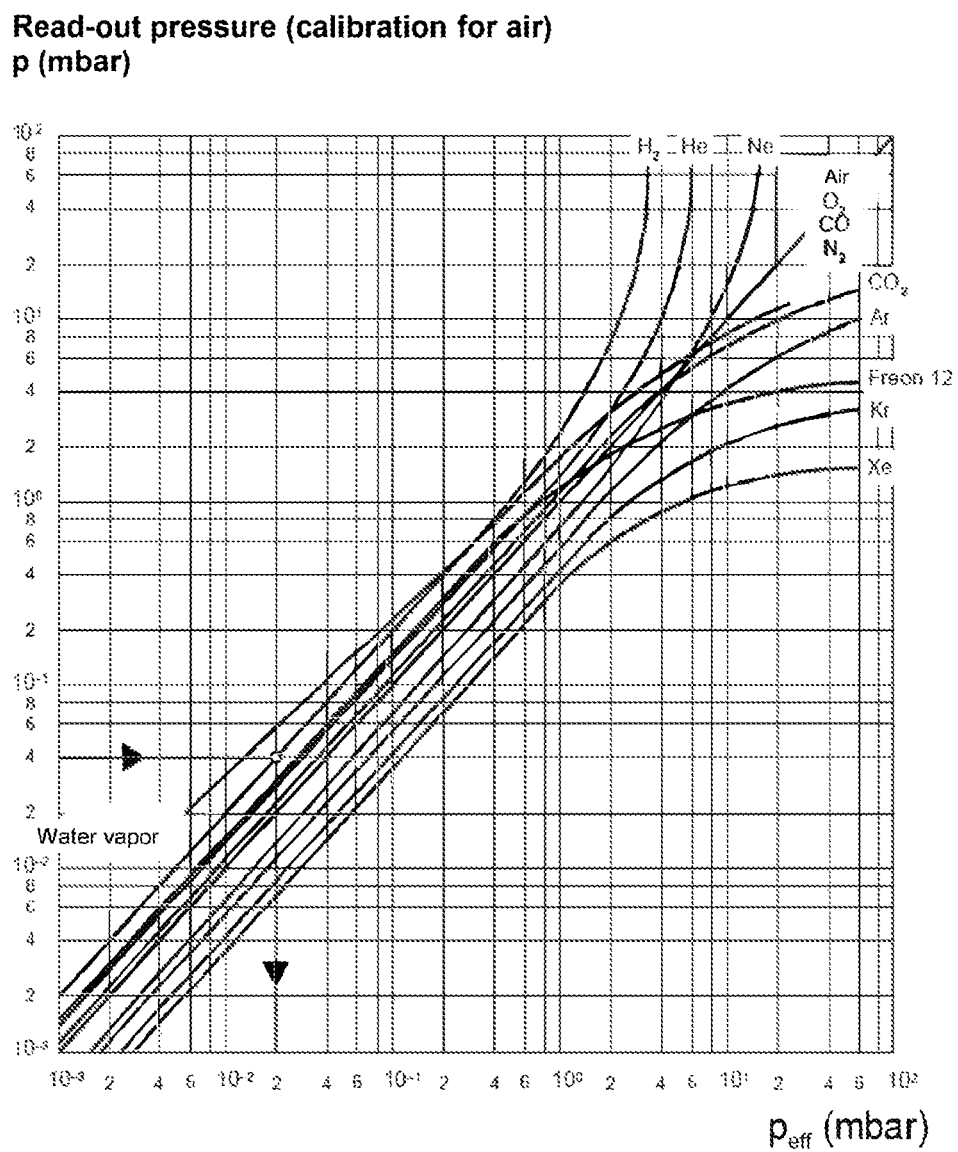

ing a resultant type of gas which best matches the combination of the recorded first measured value and the recorded second measured value, taking into account the first and second calibration data. In one variant, a resultant pressure which is independent of the type of gas is additionally determined. The invention is also directed to an apparatus for earring out the method and to a computer program product.

13 Claims, 3 Drawing Sheets

(56) References Cited

U.S. PATENT DOCUMENTS

2013/0086972 A1* 4/2013 Howe ................ G01N 33/0006
73/1.06
2018/0106658 A1* 4/2018 Smirnov ................... G01F 1/68

FOREIGN PATENT DOCUMENTS

EP        0379841  A2    8/1990
EP        1394523  A1    3/2004

* cited by examiner

Fig. 1
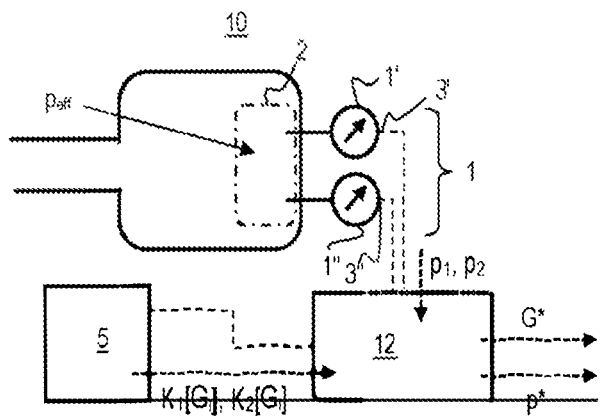
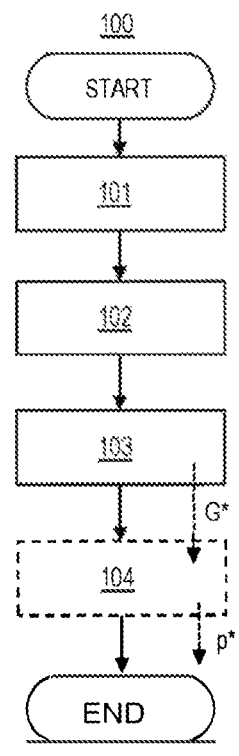
Fig. 2
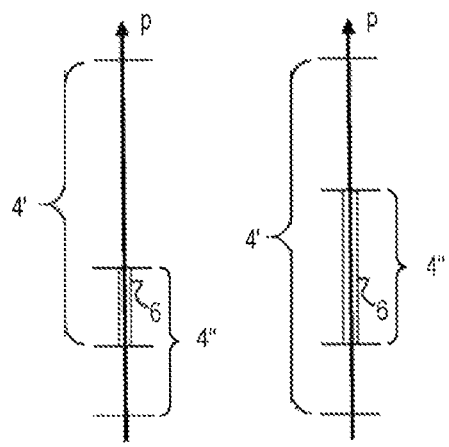
Fig. 3.a)  Fig. 3.b)

METHOD FOR OPERATING A GROUP OF PRESSURE SENSORS

CROSS-REFERENCE TO RELATED APPLICATIONS

This application is a U.S. National Stage entry of PCT Application No: PCT/EP2020/078937, filed Oct. 14, 2020, the contents of which are incorporated herein by reference.

The present invention relates to a method of operating a group of at least two pressure sensors.

In the prior art, various measuring principles for measuring a pressure are known. These measuring principles can be divided into two groups, namely the direct pressure measurement principles, which ultimately determine a force per area, and the indirect pressure measurement principles, which exploit a dependence of another physical quantity on the pressure, for example the pressure dependence of the thermal conductivity of a gas. Indirect pressure measurement principles show a more or less strong dependence on the type of gas.

Examples of pressure sensors which apply a direct, gas-type-independent pressure measurement principle are piezoelectric diaphragm pressure gauges, capacitance diaphragm pressure gauges or optical diaphragm pressure gauges. Examples of pressure sensors which use an indirect, gas-type-dependent pressure measurement principle are Pirani sensors, cold cathode ionization vacuum gauges (e.g. inverted magnetron) or hot cathode ionization vacuum gauges (e.g. Bayard-Alpert).

Pressure sensors are mostly designed for a specific pressure measurement range due to their measuring principle. The measuring range can be increased by combining several pressure sensors to a group of pressure sensors. In the case of a combination of pressure sensors, which all apply an indirect pressure measurement principle, the measuring uncertainty is increased by the gas-type dependence, since the gas-type dependence can be different with the pressure sensors involved. Furthermore, it is often not known exactly which gas or which gas mixture is present.

The object of the present invention was to mitigate difficulties arising from the gas dependence of pressure sensors. In particular, the object of the present invention was to provide a method for operating a group of pressure sensors which reduces measurement inaccuracies arising from the gas-type dependence of pressure sensors.

This object is solved by a method according to claim 1.

The method according to the invention is a method for operating a group of pressure sensors. The pressure sensors belonging to the group of pressure sensors are arranged in such a way that they can measure the pressure in a common measurement volume. The group of pressure sensors includes at least a first pressure sensor having a first pressure measurement range and a second pressure sensor having a second pressure measurement range, wherein the first and second pressure measurement ranges overlap in an overlap pressure measurement range. The first pressure sensor is based on a first indirect pressure measurement principle and is arranged to output a first measurement signal calibrated to a reference gas, e.g. nitrogen. The second pressure sensor is based on a second indirect pressure measurement principle and is set up to output a second measurement signal calibrated to the same reference gas.

The method includes the steps of:
a) providing gas-type-specific first calibration data for the first measurement signal and gas-type-specific second calibration data for the second measurement signal, wherein the first and second calibration data describe a dependence of the first and second measurement signals, respectively, on the effective pressure and on a gas type in the common measurement volume for a list of gas types comprising at least one first gas type which is different from the reference gas;
b) substantially simultaneously recording a first measured value of the first measurement signal and recording a second measured value of the second measurement signal;
c) determining a resultant gas type as the gas type in the list of gas types which best matches the combination of the recorded first measured value and the recorded second measured value, taking into account the first and second calibration data.

The first and second calibration data may be defined, for example, as a combination of a mathematical function and at least one parameter of that function. The calibration data can alternatively be defined as table values (in a look-up table). A reading of a calibration curve can be carried out by interpolating the table values.

The inventors have recognized that with the present invention, information about the type of gas present in the common measurement volume can be obtained in a simple manner. This information, as will be discussed further below, can be used to improve the accuracy of pressure measurements based on the measurement signals from the pressure sensors. However, this information about the gas type is valuable in its own right. Indeed, the group of pressure sensors, when operated in accordance with the method of the invention, can at least partially perform the task of a residual gas analyzer in a surprisingly simple manner.

The list of gas types can be a list of pure chemical substances, such as nitrogen ($N_2$), oxygen ($O_2$), helium (He), argon (Ar), xenon (Xe), carbon dioxide ($CO_2$), water vapor ($H_2O$), etc. However, the list of gas types may also include a list of gas mixtures. For example, different mixture ratios of the same gases may have separate entries in the list, each with its own calibration data. For example, such a list may include entries for 100% $N_2$, 90% $N_2$+10% Ar, 80% $N_2$+20% Ar, etc. Depending on the sensitivity of the calibration data to the gas concentrations, 5%, 2%, 1% increments, etc., may also be provided to provide calibration data that describe the gas-type dependence with sufficient accuracy. The list of gas types may combine groups of different chemical substances into one list entry. For example, in the case of a Pirani sensor, the calibration data for air, nitrogen and oxygen are treated together. For example, the list of gas types can also be defined by a list of molecular weights. In this case, chemical substances with the same molecular weight are included in a single list entry.

For the purposes of the present invention, the term list of gas types is also intended to mean a generalized form of a list in which the list entries are not determined by a finite number of list entries, but by a continuously running parameter. This parameter can be, for example, a mixing ratio of gases. As a further example, this parameter can be an average molecular weight. In this case, first and second calibration data are defined as a function of this continuous parameter via a mathematical formula or via an interpolation of table values for each value of the parameter. This generalized form of a list of gas types plays an important role, especially in the case of variants of the method according to the invention which are still to be mentioned and which are based on balancing methods ("best fit").

The calibration data can be measured data, for example. Alternatively, the calibration data can also be derived from theoretical properties of the pressure sensor. The calibration data can, for example, be based on a computer simulation, in particular taking into account the geometric shapes and dimensions of the respective pressure sensor.

Embodiments of the method result from the features of dependent claims 2 to 11.

A variant of the method comprises the additional step of d) determining a resultant pressure as a function of the recorded first measured value and the first calibration data for the resultant gas type and/or as a function of the recorded second measured value and the second calibration data for the resultant gas type.

The Inventors have recognized that, based on the previously determined information about the type of gas present, a high measurement accuracy is achieved over the entire pressure measurement range, which arises as the composite pressure measurement range of at least two pressure sensors of the group. The uncertainty of the determined pressure, which arises from the lack of knowledge about the type of gas present in the measurement volume, is reduced or ideally even disappears completely in this variant of the method. In this variant, a gas-type-independent resultant pressure is also determined.

In one variation of the method, the first and second pressure sensors are vacuum pressure sensors.

Vacuum pressure sensors benefit particularly strongly from the method according to the invention, because the lower a pressure to be measured is, the more likely it is to have to resort to an indirect pressure measurement method, which shows a gas-type dependence.

In one variation of the method, the first pressure sensor is a Pirani sensor.

Pirani sensors have a typical gas-type dependence which, for example, in the case of a sensor calibrated to nitrogen as the reference gas, indicates a measured value that is too high by a factor of 2 for water vapor, for example, and indicates a measured value that is too low by a factor of 3 for the noble gas xenon, for example. Without the method according to the invention, this is a source of great measurement uncertainty. In connection with the method according to the invention, this gas-type dependence becomes a useful source of information.

In one variant of the method, the second pressure sensor is a hot cathode ionization vacuum gauge. In particular, a hot cathode ionization vacuum gauge of the Bayard-Alpert type is used. For this measuring principle, a sensor calibrated to nitrogen shows a pressure that is 2.4 times too low in the case of hydrogen, while it outputs a pressure that is 2.5 times too high in the case of xenon.

This variant can be combined in particular with a variant that uses a Pirani sensor as the first pressure sensor. The completely different pressure measurement principles of the two sensors complement each other ideally, since their gas-type dependencies differ greatly. A change of the gas type in the common measurement volume manifests itself in a pronounced way in a deviation of the two output pressures from, e.g., $N_2$-calibrated Pirani and hot cathode sensor. In the case of xenon, for example, a Pirani sensor calibrated to $N_2$ indicates a value that is too low by a factor of 3, while the hot cathode sensor calibrated to $N_2$ indicates a value that is too high by a factor of 2.5.

In one variant of the method, the second pressure sensor is a cold cathode ionization vacuum gauge. The cold cathode ionization vacuum gauge can in particular be an inverted magnetron.

This variant also works well together with a Pirani sensor as the first pressure sensor.

In one variant of the method, the first and second gas-type-specific calibration data are each defined by a first and second factor, respectively, by which the first measurement signal and the second measurement signal, respectively, are to be multiplied to obtain the effective pressure.

Thus, for example, for the measurement signal $p_1$ of the first sensor and the $i^{th}$ gas $G_i$ the formula for the effective pressure applies $$p_{eff} = C_1[G_i]p_1$$

and for the measurement signal $p_2$ of the second sensor $$p_{eff} = C_2[G_i]p_2.$$

A table with concrete factors for a list of gas types and for Pirani and cold cathode pressure sensor types is given below.

In one variant of the method, a list of quotients is formed by forming, for each gas type from the list, a quotient from the first factor for the respective gas type and the second factor for the respective gas type, wherein a recorded quotient is formed as a quotient of the recorded first measured value and the recorded second measured value, and wherein in step c) "Determining a resultant gas type" it is determined to which of the quotients from the list of quotients the recorded quotient comes closest.

This means that a list of quotients $Q[G_i]$ is defined as $Q[G_i] = C_1[G_i]/C_2[G_i]$ or as its inverse, for each i from the list of gas types $G_i$.

The recorded quotient is calculated from the recorded measured values $p_1$ (of the first pressure sensor) and $p_2$ (of the second pressure sensor) as $Q = p_1/p_2$.

The quotient from the list $Q[G_i]$ which is closest to Q is determined as $Q^*$. The associated gas type is then the resultant gas type $G^*$.

In a variant of the method, in step c) "Determining a resultant gas type" it is determined for each gas from the list of gases, starting from the recorded first measured value based on the first and second gas-type-specific calibration data, what value would be expected for the second measurement signal if this gas were present in the common measurement volume. The smallest deviation of this value from the recorded second measured value is used as a criterion for determining the resultant gas type.

In this variant, for example, it is possible to select from a finite list of gas types. This variant is also suitable for the generalized form of a list of gas types mentioned above. As a result of the criterion of smallest deviation of the value predicted from the calibration data for the second measurement signal from the recorded second measured value, the best choice for the continuous parameter of the list of gas types is obtained, for example, for the value of a mixing ratio or a mean molecular weight. This choice of the continuous parameter defines the resultant gas type.

In one variant of the method, as the pressure in the common measurement volume changes, a plurality of pairs of a first measurement from the first pressure sensor and a second measurement from the second pressure sensor are recorded, and the gas type that best matches the combination of the recorded plurality of pairs is selected when determining the resultant gas type.

This variant of the method is particularly useful if the calibration curves of different gases differ in their dependence on the effective pressure, e.g. due to different slopes or curvatures, which are not observable solely with a measurement at a single pressure value. The condition of changing pressure in the common measurement volume can be actively achieved, for example, by switching on a pump or opening a valve to admit a gas into the common measurement volume. However, the condition of changing pressure can alternatively be achieved by continuously observing, for example, a measurement signal from one of the pressure sensors and starting the method as soon as a sufficiently fast rate of pressure change is observed. In this way, measurement data can be collected from a sufficiently large pressure range in which the different progressions of gas-dependent calibration curves are reflected in distinguishable measurement results.

Also in this variant it is possible to work with a list of gas types, where the list entries are defined by a continuous parameter. This can further increase the accuracy of the determined pressure since it is not necessary to "round" to the best fitting gas from a table. The adaptation of a continuous parameter can better represent the situation effectively present in the measurement volume from gas mixtures.

In one variant of the method, the recorded first measured value, the recorded second measured value or the resultant pressure is used to check whether the pressure present in the common measurement volume is within the overlap pressure measurement range, and the resultant pressure and/or the resultant gas type are rejected as invalid if this is not the case.

If the effective pressure in the common measurement volume does not correspond to a pressure that is within the pressure measurement range of both pressure sensors used for the steps of the method, the determined resultant gas type and, optionally, the resultant pressure will not be a reasonable one. Whether the aforementioned condition is fulfilled may turn out to be true only after some steps of the method have already been carried out. The present variant of the method provides for quality assurance in a simple way.

Further, the invention also relates to an apparatus according to claim 12, which is an apparatus for carrying out the method according to the invention.

The apparatus comprises a group of pressure sensors arranged to measure pressure in a common measurement volume. The group of pressure sensors comprises at least a first pressure sensor having a first pressure measurement range and a second pressure sensor having a second pressure measurement range, wherein the first and second pressure measurement ranges overlap in an overlap pressure measurement range. The first pressure sensor is based on a first indirect pressure measurement principle and the second pressure sensor is based on a second indirect pressure measurement principle. The apparatus further comprises means for storing first calibration data and second calibration data.

An embodiment of the apparatus further comprises a control unit operatively connected to a first measurement signal output of the first pressure sensor, to a second measurement signal output of the second pressure sensor, and to means for storing first calibration data and second calibration data for processing the measurement signals of the pressure sensors. The apparatus is further adapted to output the resultant gas type and/or the resultant pressure.

In this embodiment, the resultant gas type can remain an internal result and, for example, only the resultant pressure can be output via an interface. This allows the apparatus to behave like a single pressure sensor from the outside, which provides an accurate measurement result for the pressure regardless of the gas type in the measurement volume.

Further within the scope of the invention is a computer program product. The computer program product comprises instructions which, when the instructions are executed by a control unit of an apparatus according to the invention, cause the control unit to perform the steps of the method according to the invention or one of the variants of the method.

In the following, an example is explained on the basis of a group of pressure sensors with a Pirani sensor as the first pressure sensor (calibration data in the form of the factor $C_1$) and with a hot cathode ionization vacuum gauge (calibration data in the form of the factor $C_2$) as the second pressure sensor with concrete calibration data, which in this case are available as factors.

In the pressure range from 5*10E-2 to 5*10E-4 mbar, the following applies in good approximation $p_{eff} = C_1[Gi]*p_1$ for pressure sensor 1 and $p_{eff} = C_2[Gi]*p_2$ for pressure sensor 2, wherein the respective line of the table below is to be read off according to the gas $G_1$. This pressure range is also in the overlap pressure measurement range of the two pressure sensors. The table applies to nitrogen $N_2$ as the reference gas, so that for nitrogen the gas type-dependent factor is 1. Air (air) and oxygen ($O_2$) behave practically identically to the reference gas $N_2$ for the sensors selected here and are therefore listed in one line of the table.

| Gas | $C_1$ | $C_2$ | $Q = C_2/C_1$ | $1/Q = C_1/C_2$ |
|---|---|---|---|---|
| He | 0.8 | 5.9 | 7.38 | 0.14 |
| Ne | 1.4 | 4.1 | 2.93 | 0.34 |
| Ar | 1.7 | 0.8 | 0.47 | 2.13 |
| Kr | 2.4 | 0.5 | 0.21 | 4.80 |
| Xe | 3.0 | 0.4 | 0.13 | 7.50 |
| $H_2$ | 0.5 | 2.4 | 4.80 | 0.21 |
| Air, $O_2$, $N_2$ | 1 | 1 | 1.00 | 1.00 |
| $CO_2$ | 0.9 | 0.70 | 0.78 | 1.28 |
| $H_2O$ | 0.5 | 0.89 | 1.79 | 0.56 |

If the effective pressure $p_{eff}$ in the common measurement volume of the two pressure sensors is within the validity range of the calibration by a gas-dependent factor according to the table, the first pressure sensor delivers the measured value $p_1 = p_{eff}/C_1$ and the second pressure sensor delivers the measured value $p_2 = p_{eff}/C_2$. The quotient of the two measured values is therefore $p_1/p_2 = (C_2*p_{eff})/(C_1*p_{eff}) = C_2/C_1$, regardless of what the exact value of $p_{eff}$ is. The overlap pressure measurement range or validity range of the approximation extends over two decades in this example.

If, for example, a value of more than 7 is determined for the quotient $p_1/p_2$, the gas helium (He) fits best within the list of gases in the above table (table value for Q[He]=7.38), while the second best fitting value (Q[$H_2$]=4.80) is already relatively far away. In step c) of the method according to the invention, helium would thus be determined as the resultant gas type in this case. In step d) of the variant of the method, the resultant pressure $p*$ can now be determined with the factors for the gas helium, i.e. the resultant gas type, e.g. by the formula $p* = C_1[He]*p_1 = 0.8*p_1$.

Alternatively, the formula $p* = C_2[He]*p_2 = 5.9*p_2$ can be applied, or an average value based on measured values of both pressure sensors can be determined, for example, as $$p^* = C_1[He]^* p_1 + C_2[He]^* p_2/2.$$

Figure 5:
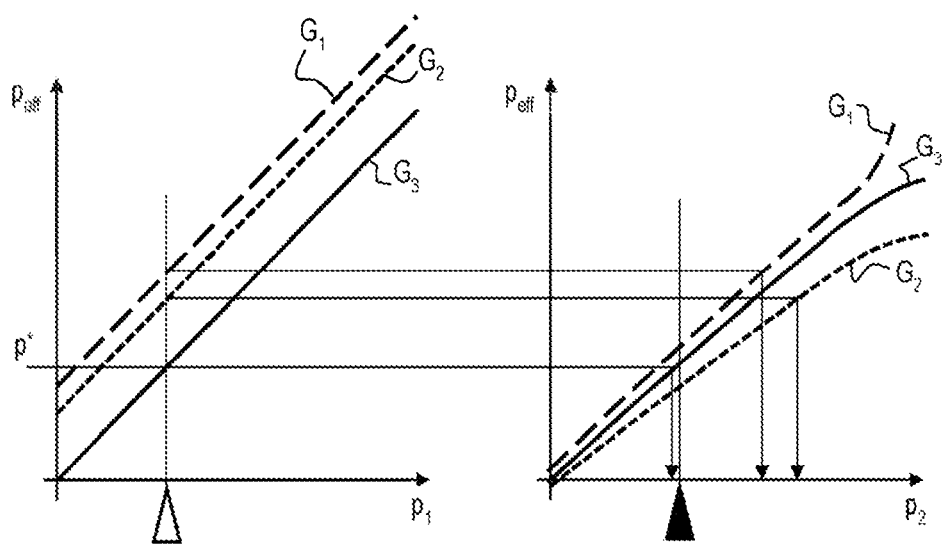

Exemplary embodiments of the present invention are explained in further detail below with reference to figures, wherein:

FIG. 1 schematically shows an apparatus for carrying out the method;

FIG. 2 shows a flowchart of the method according to the invention;

FIGS. 3.*a* and 3.*b* schematically shows possible relative positions of first and second pressure measurement ranges and resulting overlap pressure measurement range;

FIG. 4 shows the dependence of a pressure determined by a Pirani sensor on the type of gas in a double-logarithmic diagram;

FIG. 5 schematically shows first and second gas-dependent calibration curves.

FIG. 1 schematically shows an exemplary apparatus 10 for carrying out the method. The apparatus comprises a group 1 of pressure sensors, having at least one first pressure sensor 1' and one second pressure sensor 1'', which can measure pressures in a common measurement volume 2. The measurement volume 2 can in particular be a partial volume of a vacuum chamber, as indicated schematically by the dash-dotted outlined area. The first pressure sensor 1' is set up to forward a first measurement signal $p_1$ from a first measurement signal output 3' to a control unit 12. The second pressure sensor 1'' is set up to forward a second measurement signal $p_2$ from a second measurement signal output 3'' to the control unit 12. The active connections drawn with dashed lines can be implemented, for example, by wire, and they can also be implemented, for example, by radio signals (Bluetooth, etc.) or optical signal transmission. Dashed arrows show the flow of information between the elements of the apparatus. The apparatus comprises means 5 for storing gas-dependent calibration data, which can be transmitted to the control unit. A resultant gas type G* and a resultant pressure p* can be output by the control unit.

The parts of the shown apparatus or the complete apparatus can be installed in a common housing. In particular, the group of pressure sensors and the control unit may be combined in a common housing to form a pressure sensor unit. Additionally, a means for storing calibration data may optionally be housed in the common housing.

FIG. 2 shows a flowchart of the method 100 according to the invention. The method comprises the steps of
a) providing 101 gas-type-specific first calibration data $K_1[G_i]$ for the first measurement signal and gas-type-specific second calibration data $K_2[G_i]$ for the second measurement signal, wherein the first and second calibration data describe a dependence of the first and second measurement signals, respectively, on the effective pressure $p_{eff}$ and on a gas type in the common measurement volume for a list of gas types comprising at least one first gas type $G_i$ which is different from the reference gas;
b) substantially simultaneously detecting 102 a first measured value $p_1$ of the first measurement signal and detecting a second measured value $p_2$ of the second measurement signal in the overlap pressure measurement range;
c) determining 103 a resultant gas type G* as the gas type in the list of gas types that best matches the combination of the recorded first measured value $p_1$ and the recorded second measured value $p_2$, by taking into account the first and second calibration data.

Steps 101, 102 and 103 are carried out sequentially, with the necessary calibration data already being made available before the start (START) of the procedure. At the end (END) of the method, the resultant gas G* is known.

The optional step d) is shown by a dashed rectangle, which, if additionally executed, leads to a variant of the method, which also provides a resultant pressure as output. With this additional step, the resultant pressure p* is also known at the end of the method.

The additional step d) involves determining 104 a resultant pressure p* as a function of the recorded first measured value $p_1$ and the first calibration data for the resultant gas type and/or as a function of the recorded second measured value $p_2$ and the second calibration data for the resultant gas type. Based on the resultant gas type known from step c), the corresponding set of calibration data is thus used to translate the measured values of the pressure sensors into the gas-type-independent effective pressure.

FIG. 3 shows in FIG. 3.*a*) and FIG. 3.*b*) schematically two possibilities of the relative position of the first 4' and second 4'' pressure measurement range of the first 1' and second 1'' pressure sensor of the group of pressure sensors on a pressure axis p. The pressure axis p is to be understood schematically here, it could be for example a linear axis or also a logarithmic axis. High pressures are drawn further up on the axis than lower pressures. An overlap pressure measurement range 6 exists, in which the first 4' and the second 4'' pressure measurement ranges overlap. The reading of the first and second measurement signals in step a) of the method takes place while the pressure in the common measurement volume is in this overlap pressure measurement range 6. In FIG. 3.*b*) the case is shown in which the second pressure measurement range 4'' lies completely within the first pressure measurement range 4', so that the overlap pressure measurement range is identical to the second pressure measurement range 4'.

FIG. 4 shows the dependence of a pressure determined by means of a Pirani sensor on a certain type of gas in a double-logarithmic representation. In the horizontal direction, the "effective" pressure $p_{eff}$ is plotted. In the vertical direction, the pressure p (mbar) read at a Pirani sensor is plotted as a function of the effective pressure $p_{eff}$ (mbar) for different types of gas, each with a separate curve; see the label for each curve in the area at the top right of the diagram. The illustrated pressure range extends on both axes from 10-mbar to $10^2$ mbar, i.e. over 5 orders of magnitude. In this case, the Pirani sensor is calibrated to show the pressure $p_{eff}$ for the gas type air, i.e. the pressure curve to air (Air) is a straight line on the diagonal in the double-logarithmic plot. Each of the curves shown is thus a gas-type-dependent calibration curve. The first pressure sensor can be a Pirani sensor, for example, so the set of curves shown in FIG. 4 can represent the gas-type-specific first calibration data.

In a pressure range below about 1 mbar, the effect of the gas type can be described by a factor between $p_{eff}$ and the pressure p measured with the Pirani sensor, which shows up in the double-logarithmic diagram as an offset of the curves. As the inventors have recognized, the essential information of these calibration curves in over about two decades can already be described sufficiently accurately by the aforementioned factor, so that a table with the corresponding factors is a very memory-saving form of gas-type-specific initial calibration data.

Similarly, second calibration data for the second pressure sensor can be provided as a set of curves or as a table of factors.

FIG. 5 shows exemplary and schematic calibration curves for three gases, for gas $G_1$ (solid line), for gas $G_2$ (dashed with short lines) and gas $G_3$ (dashed with long lines). In the left half, the calibration curves for a first pressure sensor are shown as a function of the first measurement signal $p_1$. In the right half the calibration curves for a second pressure sensor are shown as a function of the second measurement signal $p_2$. The effective pressure $p_{eff}$ corresponding to the respective measurement signal is plotted on the vertical axis, wherein a certain vertical position in the left diagram corresponds to the same effective pressure as in the right diagram. The calibration curves are to be understood as illustrative examples which clarify the principle underlying the invention. For example, the diagrams may be double-logarithmic representations. The gas-type dependence of the first sensor is different from the gas-type dependence of the second sensor. In the second pressure sensor, variations in the slope and curvature of the curves are apparent, which are not pronounced in the calibration curves of the first sensor in this example.

A white triangle shows the determined first measurement signal of the first pressure sensor on the $p_1$ axis. At the same time, the second pressure sensor determined the second measurement signal displayed as a black triangle on the $p_2$ axis. With auxiliary lines starting from the white triangle it is indicated which effective pressure one would expect in the common measurement volume depending on the gas type and which second measurement signal would be expected at this effective pressure. Gas $G_3$ fits the actually measured values in the best manner, therefore gas $G_3$ is defined as resultant gas $G^*$. The criterion for this can be e.g. distance on the—optionally logarithmic—$p_2$ axis. On the calibration curve for $G^*=G_3$, the resultant pressure $p^*$ can now be read on the $p_{eff}$ axis.

In the event that several such pairs of first and second measurement signals are to be compared, a sum of squared distances, for example, is a suitable criterion to determine the best fitting gas. The role of first and second measurement signal can be reversed in that also starting from the actually measured second measurement signal expected measurement signals on the $p_1$ axis are determined and there—alternatively or additionally—the distance from the measured first measurement signal is determined as a criterion for the best fitting gas.

The method according to the invention and all its embodiments may be combined with an additional step of zeroing at least one of the pressure sensors. In various types of pressure sensors, the measurement signal generated for a given effective pressure is subject to drift over time. This effect can be eliminated by zeroing, which further increases the accuracy of the method according to the invention. The zero-point measurement signal is preferably determined at an effective pressure which is at least one to two decades below the measurement range of the pressure sensor to be zeroed. Checking whether a sufficiently low pressure is present can be carried out in various ways. For example, to zero a Pirani sensor, the achievement of a sufficiently low pressure can be checked with an ionization vacuum gauge whose pressure measurement range extends to at least two decades below the measuring range of the Pirani sensor. As another example, when zeroing a Bayard-Alpert type ionization vacuum gauge, reaching a sufficiently low pressure can be checked by an extractor-type ionization vacuum gauge. Reaching a sufficiently low pressure for zeroing a pressure sensor can also be achieved, for example, by suitable method steps, such as by pumping down the common measurement volume for a long time. The achievement of a sufficiently low pressure can alternatively also be derived from operating parameters of a vacuum pump operatively connected to the common measurement volume of the pressure sensors.

It should be noted that the drift of the pressure sensor and the gas-type dependence are two separate phenomena. For example, even if the pressure sensor is always reset to zero after each change of gas type, there is still a gas-type dependency.

Returning to the way in which a list of gas types, which may include a list of gas mixtures, can be handled, the following illustrative examples are given. For example, in the case of a Pirani sensor, the idea is to summarize the contributions of the thermal conductivity of each component of the gas mixture to the total thermal conductivity. For example, with formula 11 from the publication K. Jousten, *On the gas species dependence of Pirani vacuum gauges, Vac. Sci. Technol.* A 26, 3, May/June 2008, Jousten gives a formula which takes into account effective accommodation coefficients and heat capacities of each gas species involved in a mixture. Alternatively, also suitable for Pirani sensors, with formulas 17 and 18 from the publication Ikhsan Setiawan et al, *Critical Temperature Differences of a Standing Wave Thermoacoustic Prime Mover with Various Helium-Based Binary Mixture Working Gases*, 2015 J. Phys.: Conf. Ser. 622 012010, Setiawan gives a formula, which based on the gas fraction, thermal conductivities and molar masses of each gas species involved, indicates the thermal conductivity of the gas mixture. Both of the above formulas are suitable for generating a table of gas types in the form of gas mixtures, or also for using a fraction of one or more gas types as a continuous parameter. The latter is advantageous for the "best fit" procedures as described above.

A similar, but somewhat more complex procedure is possible with ionization vacuum gauges. Here, the energy distribution of the electrons, the ionization potential of the gases, the fragmentation of the gases and any recombination are important as possible influencing variables for the prediction of an ion current. If the sensitivity S, which is defined as the ratio of ion current at the ion collector on the one hand and electron emission current and pressure on the other, is known from experimental data or simulations, the combined ion current can be determined as the sum weighted with partial pressures of the gas types involved. Pressures and partial pressures are considered as the difference to the residual pressure, collector currents as the difference to the collector current at the residual pressure.

LIST OF REFERENCE SIGNS

1 Group of pressure sensors
1' First pressure sensor
1" Second pressure sensor
2 Common measurement volume
3' First measurement signal output
3" Second measurement signal output
4' First pressure measurement range
4" Second pressure measurement range
5 Means for storing calibration data
6 Overlap pressure measurement range
12 Control unit
G* Resultant gas type
$p_1$ First measurement signal $p_2$ Second measurement signal
$p_{eff}$ Effective pressure
$p^*$ Resultant pressure
100 Method
101 Step a) Providing calibration data
102 Step b) Recording of the first and second measurement
signals
103 Step c) Determining the resultant gas type
104 Step d) Determining the resultant pressure
START Start of method
END End of method

The invention claimed is:

1. A method for operating a group (1) of pressure sensors (1', 1") which are arranged to measure the pressure in a common measurement volume (2),
  wherein the group of pressure sensors comprises at least a first pressure sensor (1') having a first pressure measurement range (4') and a second pressure sensor (1") having a second pressure measurement range (4"), wherein the first and second pressure measurement ranges overlap in an overlap pressure measurement range (6),
  wherein the first pressure sensor (1') is based on a first indirect pressure measurement principle exploiting a first pressure-dependence of a physical quantity other than pressure and is adapted to output a first measurement signal calibrated to a reference gas ($G_{ref}$), wherein the second pressure sensor (1") is based on a second indirect pressure measurement principle exploiting a second pressure-dependence of a physical quantity other than pressure and is adapted to output a second measurement signal calibrated to the reference gas, and
  wherein the method comprises:
  a) providing (101) gas-type-specific first calibration data ($K_1[G_i]$) for the first measurement signal and gas-type-specific second calibration data ($K_2[G_i]$) for the second measurement signal, wherein the first and second calibration data describe a dependence of the first and second measurement signals, respectively, on an effective pressure ($p_{eff}$) and on a gas type in the common measurement volume for a list of gas types comprising at least one first gas type ($G_1$) which is different from the reference gas;
  b) simultaneously recording (102) a first measured value ($p_1$) of the first measurement signal and recording a second measured value ($p_2$) of the second measurement signal;
  c) determining (103) a resultant gas type ($G^*$) as that gas type in the list of gas types which best matches a combination of the recorded first measured value ($p_1$) and the recorded second measured value ($p_2$), taking into account the first and second calibration data;
  o1) outputting the resultant gas type; and/or
  o2) determining the pressure in the common measurement volume based on the resultant gas type and outputting the determined pressure.

2. The method according to claim 1, further comprising:
  d) determining (104) a resultant pressure ($p^*$) as a function of the recorded first measured value ($p_1$) and the first calibration data for the resultant gas type and/or as a function of the recorded second measured value ($p_2$) and the second calibration data for the resultant gas type.

3. The method according to claim 1, wherein the first and second pressure sensors are vacuum pressure sensors.

4. The method according to claim 1, wherein the first pressure sensor (1') is a Pirani sensor.

5. The method according to claim 1, wherein the second pressure sensor (1") is a hot-cathode ionization vacuum gauge, including a Bayard-Alpert type.

6. The method according to claim 1, wherein the second pressure sensor (1") is a cold cathode ionization vacuum gauge, in particular an inverted magnetron.

7. The method according to claim 1, wherein first and second gas-type specific calibration data ($K_1[G_i]$, $K_2[G_i]$) are each defined by a first and second factor ($C_1[G_i]$, $C_2[G_i]$), respectively, by which the first measurement signal and the second measurement signal, respectively, are multiplied to obtain the effective pressure.

8. The method according to claim 7, wherein a list of quotients is formed by forming a quotient ($Q[G_i]$) for each gas type from the list from the first factor for the respective gas type and the second factor for the respective gas type, wherein a recorded quotient (Q) is formed as a quotient of the recorded first measured value ($p_1$) and the recorded second measured value ($p_2$), and wherein in c) it is determined to which of the quotients ($Q^*$) from the list of quotients the recorded quotient comes closest.

9. The method according to claim 1, wherein in c) for each gas from the list of gas types, starting from the recorded first measured value ($p_1$), based on the first and second gas-type-specific calibration data, it is determined what value is expected for the second measurement signal if this gas were present in the common measurement volume, and
  wherein a smallest deviation of this value from the recorded second measured value ($p_2$) is used as a criterion for determining the resultant gas type.

10. The method according to claim 1, wherein a plurality of pairs of a first measured value of the first pressure sensor and a second measured value of the second pressure sensor are each recorded as the pressure in the common measurement volume changes, wherein the gas type that best matches the combination of the recorded plurality of pairs is selected when determining the resultant gas type ($G^*$).

11. The method according to claim 1, wherein it is checked on a basis of the recorded first measured value ($p_1$), on a basis of the recorded second measured value ($p_2$) or on a basis of the resultant pressure ($p^*$) whether the pressure present in the common measurement volume lies in the overlap pressure measurement range and wherein the resultant pressure and/or the resultant gas type are rejected as invalid if this is not the case.

12. An apparatus (10) for carrying out the method according to claim 1, wherein the apparatus comprises a group (1) of pressure sensors arranged such that they are capable of measuring the pressure in a common measurement volume (2), wherein the group of pressure sensors comprises at least a first pressure sensor (1') having a first pressure measurement range (4') and a second pressure sensor (1") having a second pressure measurement range (4"), wherein the first and second pressure measurement ranges overlap in an overlap pressure measurement range (6), wherein the first pressure sensor (1') is based on a first indirect pressure measurement principle exploiting a first pressure-dependence of a physical quantity other than pressure and the second pressure sensor (1") is based on a second indirect pressure measurement principle exploiting a first pressure-dependence of a physical quantity other than pressure,
  wherein the apparatus comprises means (5) for storing first calibration data and second calibration data, and
  wherein the apparatus (10) comprises a control unit (12) which is operatively connected to a first measurement signal output (3') of the first pressure sensor, to a second measurement signal output (3") of the second pressure sensor and to means (5) for storing first calibration data and second calibration data for processing the measurement signals of the pressure sensors, wherein the control unit (12) is adapted to:
i) determining a gas type in the common measurement volume and outputting the determined gas type; and/or
ii) determining a gas type in the common measurement volume and determining the pressure in the common measurement volume based on the gas type and outputting the determined pressure.

13. A non-transitory computer readable medium containing computer instructions stored therein for causing a computer processor of a control unit (12) of an apparatus (10) according to claim 12, to perform a method (100):
for operating a group (1) of pressure sensors (1', 1") which are arranged to measure the pressure in a common measurement volume (2),
wherein the group of pressure sensors comprises at least a first pressure sensor (1') having a first pressure measurement range (4') and a second pressure sensor (1") having a second pressure measurement range (4"), wherein the first and second pressure measurement ranges overlap in an overlap pressure measurement range (6),
wherein the first pressure sensor (1') is based on a first indirect pressure measurement principle exploiting a first pressure-dependence of a physical quantity other than pressure and is adapted to output a first measurement signal calibrated to a reference gas ($G_{ref}$), wherein the second pressure sensor (1") is based on a second indirect pressure measurement principle exploiting a second pressure-dependence of a physical quantity other than pressure and is adapted to output a second measurement signal calibrated to the reference gas, and wherein the method comprises:
a) providing (101) gas-type-specific first calibration data ($K_1[G_i]$) for the first measurement signal and gas-type-specific second calibration data ($K_2[G_i]$) for the second measurement signal, wherein the first and second calibration data describe a dependence of the first and second measurement signals, respectively, on the effective pressure ($p_{eff}$) and on a gas type in the common measurement volume for a list of gas types comprising at least one first gas type ($G_1$) which is different from the reference gas;
b) simultaneously recording (102) a first measured value ($p_1$) of the first measurement signal and recording a second measured value ($p_2$) of the second measurement signal;
c) determining (103) a resultant gas type ($G^*$) as that gas type in the list of gas types which best matches the combination of the recorded first measured value ($p_1$) and the recorded second measured value ($p_2$), taking into account the first and second calibration data;
o1) outputting the resultant gas type; and/or
o2) determining the pressure in the common measurement volume based on the resultant gas type and outputting the determined pressure.

* * * * *